United States Patent
Patel et al.

(10) Patent No.: US 12,432,156 B2
(45) Date of Patent: Sep. 30, 2025

(54) METHOD AND APPARATUS FOR EFFICIENT PACKING OF FLOW CONTROL UNITS

(71) Applicant: Arm Limited, Cambridge (GB)

(72) Inventors: Apurva Patel, Austin, TX (US); Ashok Kumar Tummala, Cedar Park, TX (US); Ranjini Mysore Nagaraju, Georgetown, TX (US); Mark Gerald LaVine, Austin, TX (US)

(73) Assignee: Arm Limited, Cambrige (GB)

( * ) Notice: Subject to any disclaimer, the term of this patent is extended or adjusted under 35 U.S.C. 154(b) by 197 days.

(21) Appl. No.: 18/096,314

(22) Filed: Jan. 12, 2023

(65) Prior Publication Data

US 2024/0244008 A1 Jul. 18, 2024

(51) Int. Cl.
*H04L 47/35* (2022.01)
*H04L 43/0882* (2022.01)
*H04L 47/28* (2022.01)
*H04L 49/90* (2022.01)

(52) U.S. Cl.
CPC .......... *H04L 47/35* (2013.01); *H04L 43/0882* (2013.01); *H04L 47/28* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,628,615 B1 * | 9/2003 | Joseph | H04L 12/56 370/231 |
| 9,432,298 B1 * | 8/2016 | Smith | H04L 49/9057 |
| 11,496,418 B1 * | 11/2022 | Blair | H04L 49/15 |
| 2014/0115420 A1 * | 4/2014 | Willey | G06F 11/1004 714/758 |
| 2015/0350082 A1 * | 12/2015 | Pawlowski | G06F 3/0611 370/412 |

(Continued)

FOREIGN PATENT DOCUMENTS

| | | | | |
|---|---|---|---|---|
| EP | 3936999 A1 * | 1/2022 | | G06F 13/1668 |
| TW | 1605343 B | * 11/2017 | | |
| WO | WO-2017052662 A1 * | 3/2017 | | H04L 1/00 |

OTHER PUBLICATIONS

NPL to Ansari et al. 'Hybrid Test Data Transportation Scheme for Advanced NoC-Based SoCs'; Journal of Semiconductor Technology and Science, vol. 15, No. 1, Feb. 2015; DOI: 10.5573/JSTS.2015.15.1.085 (Year: 2015).*

(Continued)

*Primary Examiner* — Sandarva Khanal
(74) *Attorney, Agent, or Firm* — Leveque Intellectual Property Law, P.C.

(57) ABSTRACT

A mechanism is provided efficient packing of network flits in a data processing network. Transaction messages for transmission across a communication link of a data processing network are analyzed to determine a group of transaction messages to be passed to a packing logic block for increased packing efficiency. The transaction messages are packed into slots of one or more network flits and transmitted across a communication link. The mechanism reduces the number of unused slots in a transmitted network.

20 Claims, 7 Drawing Sheets

(56) References Cited

U.S. PATENT DOCUMENTS

| | | | |
|---|---|---|---|
| 2016/0085619 A1* | 3/2016 | Iyer | H04L 1/0045 |
| | | | 714/807 |
| 2016/0283112 A1* | 9/2016 | Blankenship | G06F 12/0802 |
| 2017/0171095 A1* | 6/2017 | Prasadh | H04L 47/41 |
| 2019/0095363 A1* | 3/2019 | Agarwal | G06F 13/1668 |
| 2021/0112132 A1* | 4/2021 | Paliwal | H04L 45/74 |
| 2022/0066636 A1* | 3/2022 | Taki | G06F 3/0679 |
| 2022/0141322 A1* | 5/2022 | Jeon | H04L 67/08 |
| | | | 709/224 |
| 2024/0184477 A1* | 6/2024 | Agarwal | G06F 3/0604 |

OTHER PUBLICATIONS

An Introduction to CCIX® White Paper, https://www.ccixconsortium.com/wp-content/uploads/2019/11/CCIX-White-Paper-Rev111219.pdf, ccixconsortium.com was first indexed by Google in May 2016.
Kurt Lender, Compute Express Link™ (CXL™): A Coherent Interface for Ultra-High-Speed Transfers, © CXL™ Consortium 2020, Jul. 21, 2020.

* cited by examiner

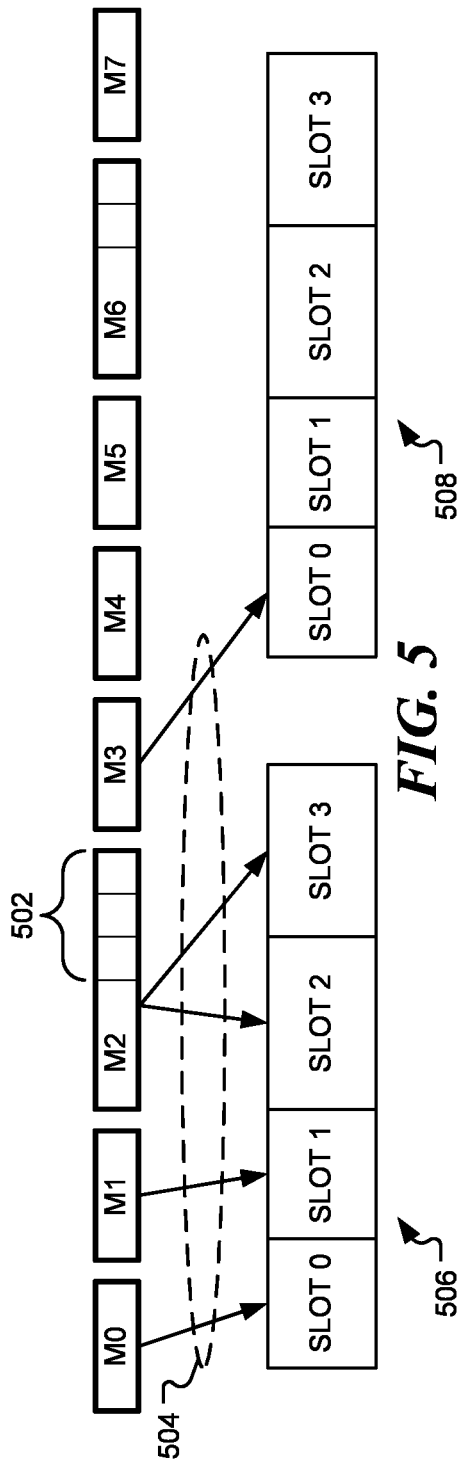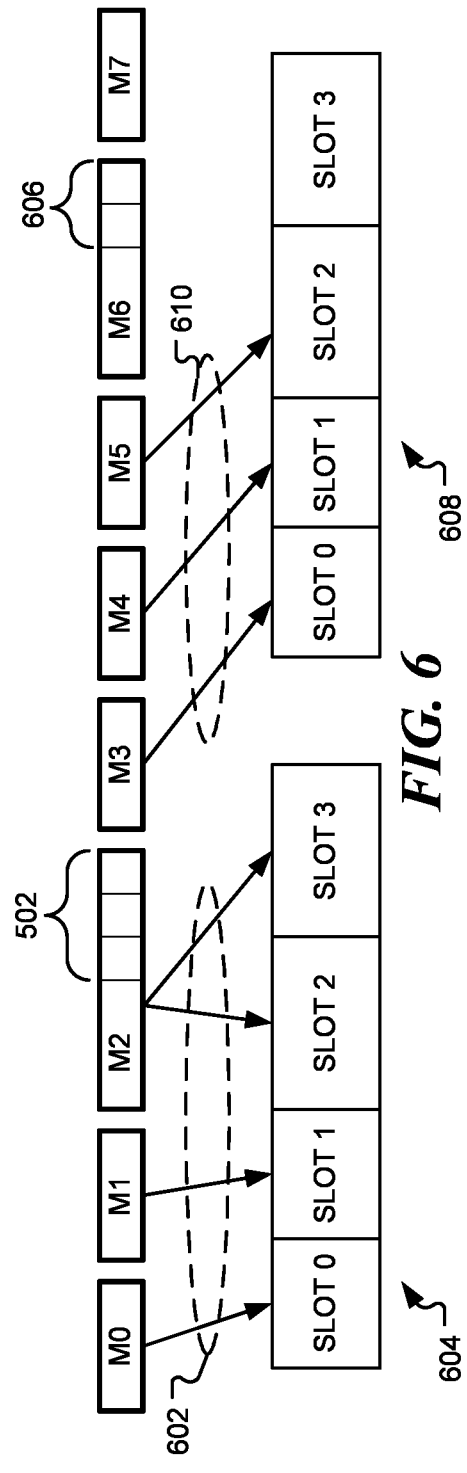

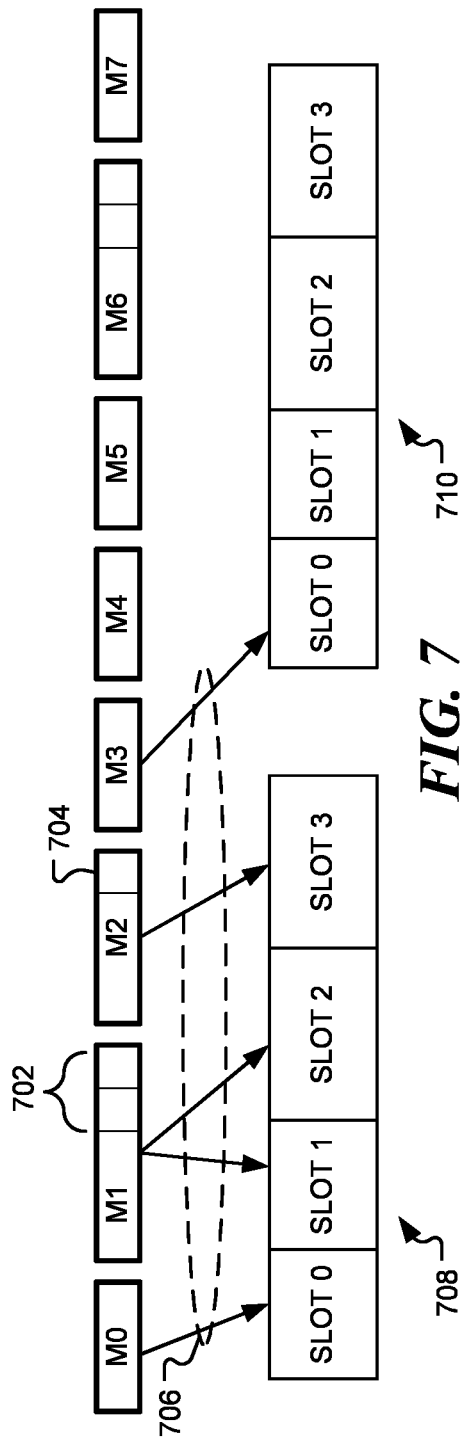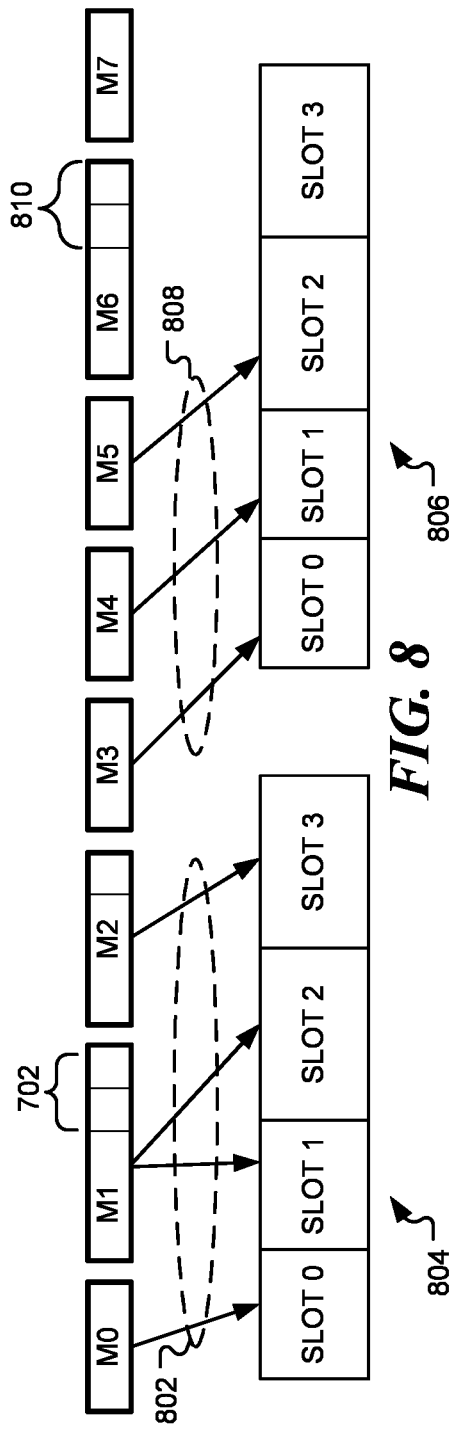

METHOD AND APPARATUS FOR EFFICIENT PACKING OF FLOW CONTROL UNITS

BACKGROUND

A network flow control unit or network "flit" is an atomic block of data that is transported across a data processing network by hardware. A single transaction message may be transported in multiple network flits, consisting of a header flit, body flits and, optionally, a tail flit. Alternatively, one or more transaction messages can be packed in a single flit. In this case, packaging of packets into flits is performed by hardware in the link layer of the network. A group of transaction messages are passed to a flit packing logic block that, in turn, packs the messages into one or more flits. When the passed transaction messages are too large to fit into a single flit, they overflow into one or more additional flits. As a result, the additional flits may be only partially filled, resulting inefficient data transfer.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

FIGS. 4-12 illustrate packing transaction messages into one or more network flits, in accordance with various representative embodiments.

DETAILED DESCRIPTION

Figure 1:
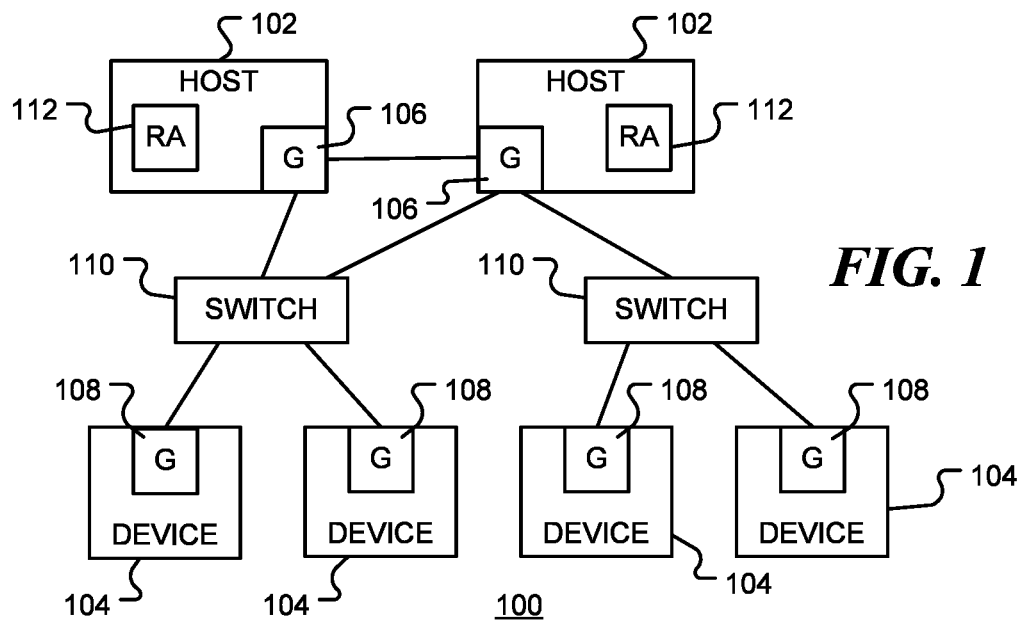
FIG. 1 is a simplified block diagram of a data processing system, in accordance with embodiments.

The various apparatus and devices described herein provide mechanisms for packing transaction messages into a network flit in a data processing system.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

FIG. 1 is a simplified block diagram of a data processing network 100, in accordance with embodiments of the present disclosure. Data processing network 100 includes multiple integrated circuits (ICs) or chips, such as host ICs 102 and device ICs 104. A host IC may include a one or more processors. A chip-to-chip gateway 106 of a host IC 102 couples to corresponding chip-to-chip gateways 108 on device IC 104 to provide one or more communication links. The links enable messages to be passed, in one or more flits, between the host ICs and device ICs. The links may include switches 110 to enable a host IC to communicate with two or more device ICs or to enable two or more host ICs to communicate with the same device IC or with each other.

An example link is Compute Express Link™ (CXL™) of the Compute Express Link Consortium, Inc. CXL™ provides a coherent interface for ultra-high-speed transfers between a host and a device, including transaction and link layer protocols together with logical and analog physical layer specifications.

A further example link is a symmetric multi-processor (SMP) link between processors with a shared memory.

Host 102 includes one or more requesting agents, such as a central processing unit (CPU) or CPU cluster.

Transactions between chips may involve an exchange of messages, such as requests and responses. A packing logic block packs transaction messages and data into flow control units or "flits" to be sent over a symmetric multi-processor (SMP) or chip-to-chip (C2C) link. Herein, a packing logic block is an integrated circuit block, or software description thereof, used in a modular data processing chip. In order to increase the bandwidth and link utilization, the packing logic block maximizes the number of request messages and data packed into each flit. The size of a request message size may vary. For example, a message may have a variable number of extension portions. The extension portions may be referred to herein as "extensions." Thus, for the packing logic block to work most efficiently, it should be able to observe pending messages in order to determine the maximum number of messages and data that can fit into each network flit. However, this can increase the complexity, area and latency of the packing logic.

In accordance with embodiments of disclosure, circuitry for determining the number of messages that can be efficiently packed into a network flit is placed before the packing logic block. This enables the process to be performed dynamically based on incoming request stream, from central processing unit (CPU) and peripheral component express (PCIe) request agents, and corresponding responses.

Figure 2:
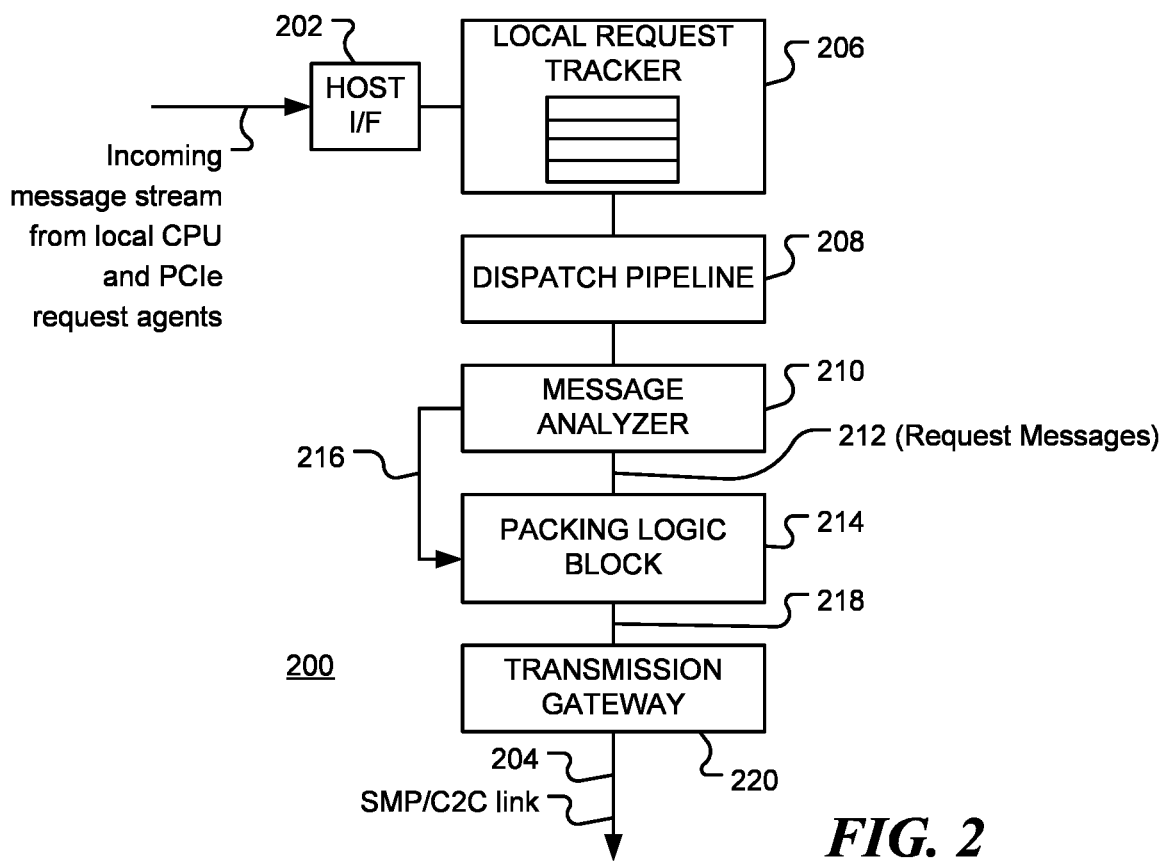
FIG. 2 is a block diagram of a gateway block, in accordance with various representative embodiments.

FIG. 2 is a block diagram of a gateway block 200 of a data processing network, in accordance with various representative embodiments. The gateway block receives request messages from various local request agents at host interface 202. These request messages are generated when a request agent needs to send a request to a destination that resides on a different chip. The request is sent to its destination via gateway block 200 and SMP/C2C link 204. Gateway block 200 is also configured to handle the responses from local agents.

A request from a local agent is allocated within local request tracker 206. Local request tracker 206 is a mechanism for monitoring transaction requests and may include a table for storing request identifiers and associated data such as transaction status. Requests that are ready to send are passed through request dispatch pipeline 208. Dispatch pipeline 208 may include a tracker request picker and a dispatch first-in, first-out (FIFO) buffer, for example. Message analyzer 210 observes the request messages and determines the number of messages to send. The selected messages 212 are sent to packing logic block 214. In addition, message analyzer 210 may provide signal 216, indicating the number of messages to be packed, to packing logic block 214. In turn, packing logic block 214 packs requests 212 into a transaction layer flit packet 218 (containing one or more network flits) and sends the packet to transmission gateway 220 to be transmitted over the SMP/C2C communication link 204. Response messages are treated in a similar manner. Message analyzer 210 is configured to analyze both request and response messages, collectively called "transaction messages" or just "messages." Message analyzer 210 and packing logic block 214 may be implemented as a single logic block or as two or more logic blocks.

Packing logic block 214 can receive a limited number of messages in each clock cycle. For example, in one embodiment, a maximum of four messages per cycle can be sent to packing logic block 214. The packing logic block analyzes the size of each message and fits as many as possible into a first network flit. If the packing logic is not able to fit all the received messages into a single network flit, then additional network flits are used. However, an additional network flit may be only partially filled, leading to a decrease in packing efficiency, bandwidth and link utilization.

In accordance with various embodiments, message analyzer 210 determines, in advance, the maximum number of received messages that can be fitted efficiently into one or more network flits, without unnecessary unused space. That is, without leaving any unused slot or slots large enough to store a received message. For example, a slot is only left unused when the received message, with its extension portions, is too large to fit in the slot. The maximum number may be determined by analyzing messages in the dispatch pipeline. The determination may be based on the size of each message or, equivalently, the number of extension portions in each message. Only those messages that can be efficiently fitted into one or more flits are sent to the packing logic block. The packing logic block can then efficiently pack the maximum number of messages in each cycle, optimizing packing efficiency, bandwidth and link utilization.

Figure 3:
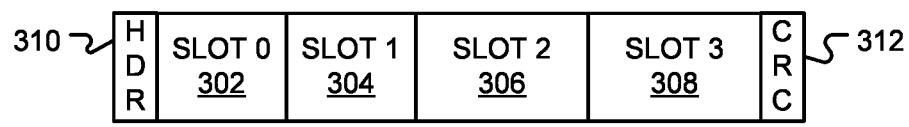
FIG. 3 shows an example network flit.

FIG. 3 shows an example network flit 300, that includes four slots 302, 304, 306 and 308, optional header 310 and optional cyclic redundancy code (CRC) 312 for error checking. The slot sizes are fixed. Other formats may be used for the network flit. TABLE 1 describes example slot sizes for a 64-Byte (64B) network flit. In this example, a transaction message includes a 12-Byte fixed size portion and zero or more extension portions of 4 Bytes each.

TABLE 1

| Slot Number | Max. size of the message that can be fitted without overlapping the next slot | Max. number of extensions without overlapping the next slot |
| --- | --- | --- |
| 0 | 12 Bytes | 0 |
| 1 | 12 Bytes | 0 |
| 2 | 16 Bytes | 1 |
| 3 | 16 Bytes | 1 |

Figure 4:
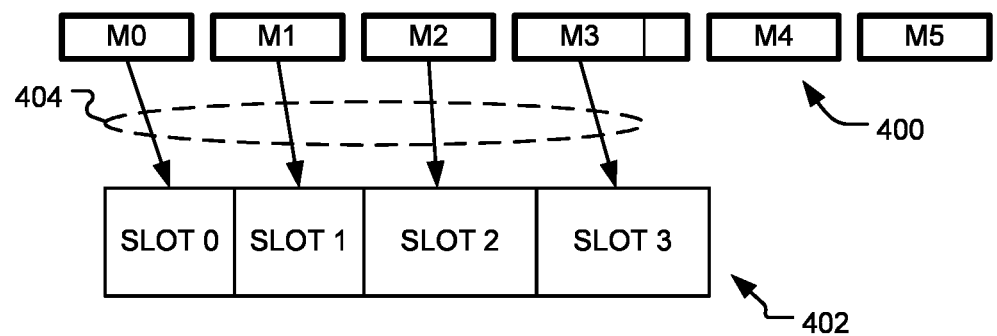

FIG. 4 illustrates contents 400 of a dispatch FIFO comprising messages M0-M5 in accordance with a method of the disclosure. A dispatch FIFO picker retrieves up to four messages from the dispatch FIFO, on a first-in, first-out basis, and the size of each of the messages is analyzed. In the example shown, messages M0-M2 all have no extension while M3 has a single extension, so all four messages can fit in a single network flit 402. Thus, all four messages will be sent in a group to the packing logic block and packed into network flit 402, as indicated by broken line 404.

If any of the messages have one or more extensions, including any extension the packing logic may add, then all four messages may not fit into a single network flit.

TABLE 2 summarizes the cases where a maximum of three messages can be packed into single four-slot network flit. In all other cases four requests can be sent, without impacting packing efficiency.

TABLE 2

Cases that allow maximum of three messages per flit

| | |
| --- | --- |
| Case: 1 | Messages 0 and 1 have no extension, and either Message 2 has more than one but less than 5 extensions or Message 2 has no more than one extension and Message 3 has more than one extension. |
| Case: 2 | Message 0 has no extensions and Message 1 has 1-4 extensions, Message 2 or Message 3 has no more than one extension. |
| Case: 3 | Message 0 has 1-3 extensions Message 1 and Message 2 have no more than one extension each. |

The message analyzer is configured to detect conditions where only three messages can be packed into a single network flit, rather than all four messages. In one embodiment, the message analyzer determines the number of transaction messages that can be efficiently packed into one or more network flits without unnecessary unused slots. In the example above, when a network flit has four slots, three messages are sent to the packing logic block when only three messages fit in a single flit. Otherwise, four messages are sent to the packing logic block. This reduces the complexity of the packing logic, saving power and area. Depending on the sizes, the four messages may be in a single flit or two messages in each of two successive flits, for example.

In a further embodiment, the maximum number of messages that will fit in a single network flit is sent to the packing logic block as a group. The packing logic block packs the messages into a single network flit for transmission in a single cycle.

FIG. 5 illustrates a case where four messages (M0-M3) are passed to the packing logic block. No message analyzer is used. This corresponds to case 1 in TABLE 2. Messages M0 and M1 have no extensions, while message M2 has three extensions, 502. Four messages M0-M3, indicated by broken line 504 are passed in a group to the packing logic block. Messages M0 and M1 are packed into slots 0 and 1, respectively, of first network flit 506. Message M2 does not fit in slot 2 and overflows into slot 3. Thus, message M3 is packed into slot 0 of second network flit 508. Flits 506 and 508 are transmitted on consecutive cycles, even though slots 1-3 of flit 508 are empty.

FIG. 6 illustrates the same case (Case 1) when the mechanism of the present disclosure is used. In this case, the message analyzer determines that only three messages M0-M2 will fit into a single flit, so only these messages are sent, as indicated by broken line 602, and packed into flit 604. Messages M3-M5 are sent as a group to the dispatch logic in the next cycle to be placed efficiently into network flit 608, as indicated by broken line 610. Message M6 is too large for the remaining slot, so is not sent. Thus, in two cycles, six messages M0-M5 are sent. In contrast, as shown in FIG. 5, only four messages are sent in the same two cycles.

FIG. 7 illustrates a further case where four messages (M0-M3) are passed to the packing logic block. No message analyzer is used. This corresponds to case 2 in TABLE 2. Message M0 has no extensions, message M1 has two extensions 702 and message M2 has one extension, 704. Four messages M0-M3, indicated by broken line 706 are passed in a group to the packing logic block. Message M0 is placed in slot 0 of network flit 708. Message M1 is placed in slot 1 and overflows into slot 2. Message M2 is placed in slot 3. Message M3 is packed into slot 0 of network flit 710. Network flits 708 and 710 are transmitted on consecutive cycles, even though slots 1-3 of flit 710 are empty.

FIG. 8 illustrates the same case (case 2) when the mechanism of the present disclosure is used. In this case, the message analyzer determines that only three messages M0-M2 will fit into a single flit, so only these messages are sent, as indicated by broken line 802, and packed into first network flit 804. Messages M3-M5 are sent to the dispatch logic in the next cycle to be placed efficiently into second network flit 806, as indicated by broken line 808. Message M6 is too large for the remaining slot, since it has two extension 810, so is not sent in this group. Thus, in two cycles, six messages M0-M5 are sent. In contrast, as shown in FIG. 7, only four messages are sent in the same two cycles.

Figure 9:
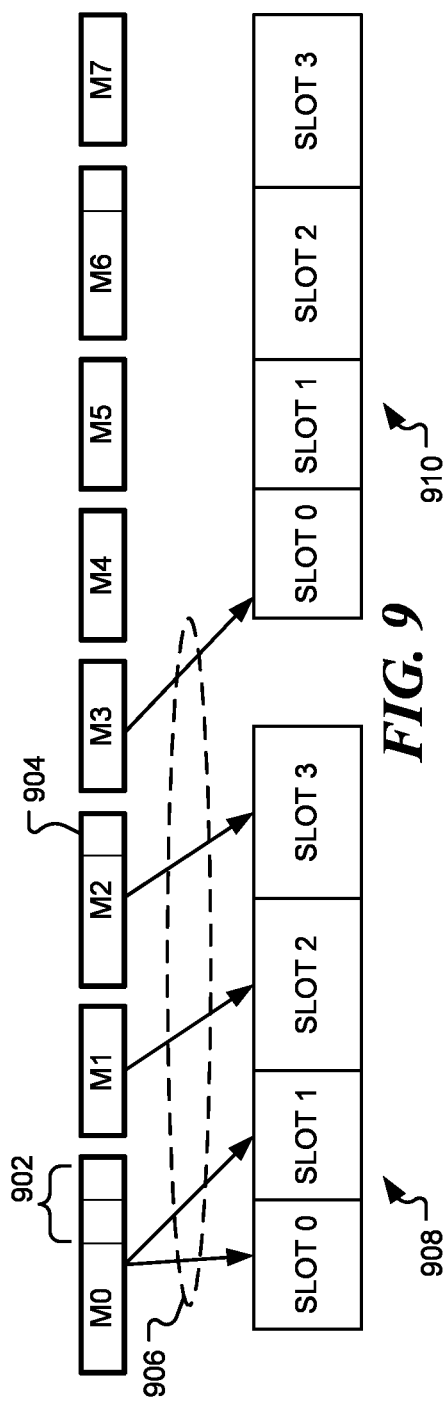

FIG. 9 illustrates a further case where four messages (M0-M3) are passed to the packing logic. No message analyzer is used. This corresponds to case 3 in TABLE 2. Message M0 has two extensions, 902, message M1 has no extensions and message M2 has one extension, 904. Four messages M0-M3, indicated by broken line 906 are passed in a group to the packing logic. Message M0 is placed in slot 0 of first network flit 908 and overflows into slot 1. Message M1 is placed in slot 2. Message M2 is placed in slot 3. Message M3 is packed into slot 0 of second network flit 910. Network flits 908 and 910 are transmitted on consecutive cycles, even though slots 1-3 of flit 910 are empty.

Figure 10:
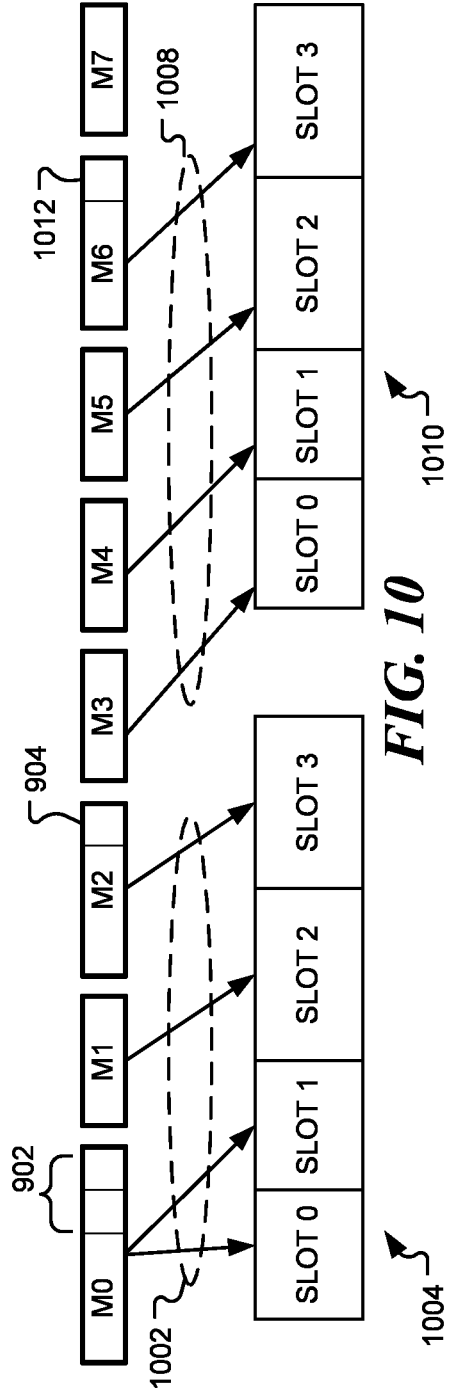

FIG. 10 illustrates the same case (case 3) when the mechanism of the present disclosure is used. In this case, the message analyzer determines that only three messages M0-M2 will fit into a single network flit, so only these messages are sent, as indicated by broken line 1002, and packed into flit 1004. Messages M3-M6 are sent to the dispatch logic block in the next cycle to be placed efficiently into network flit 1006, as indicated by broken line 1008. Message M6 has only one extension, so can be placed in slot 3 of network flit 1006. Thus, in two cycles, seven messages M0-M6 are sent. In contrast, as shown in FIG. 9, only four messages are sent in the same two cycles.

Figure 11:
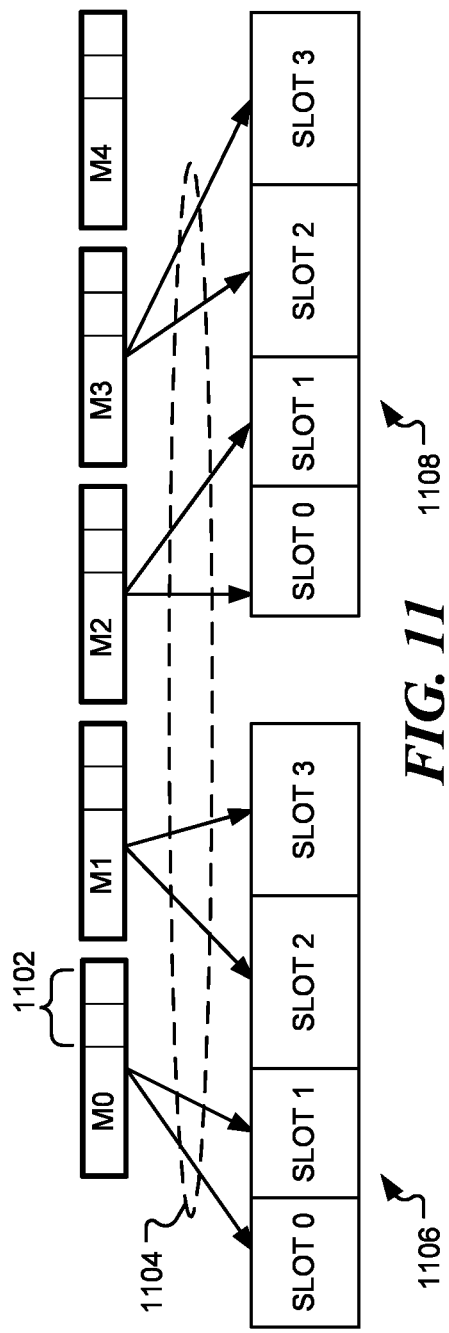

FIG. 11 illustrates a case where a set of four messages (M0-M3) are analyzed. All messages have two extensions, such as extension 1102 in message M0. In this example, all four messages M0-M3, indicated by broken line 1104 are passed to the packing logic block. Message M0 is placed in slots 0 of first network flit 1106 and overflows into slot 1. Message M1 is placed in slot 2 and overflows into slot 3. Similarly, messages M2 and M3 are placed in second network flit 1108. Network flits 1106 and 108 are transmitted in consecutive cycles and provide maximum efficiency.

Figure 12:
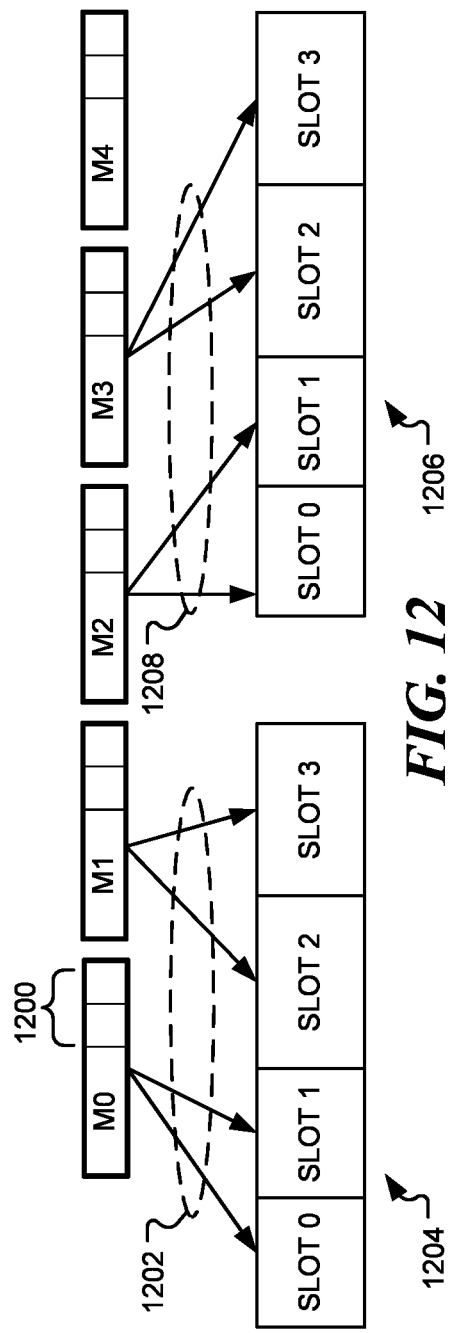

FIG. 12 illustrates the same case where a set of four messages (M0-M3) are analyzed, all messages having two extensions (E.g., 1200). In this example, only two messages, M0 and M1 sent to the packing logic block in a first cycle, as indicated by broken line 1202. Message M0 is placed in slot 0 of network flit 1204 and overflows into slot 1. Message M1 is placed in slot 2 and overflows into slot 3. In a second cycle, message M2 and M3 are passed to the packing logic block and are placed in network flit 1206, as indicated by broken line 1208. Network flits 1204 and 1206 are transmitted in consecutive cycles, and again provide maximum efficiency. Thus, for this case, maximum efficiency may be obtained by passing two messages at a time or sending all four messages.

In general, the number of messages passed to the packing logic is determined such that there is a minimum number of unused slots in the transmitted flits.

In this way, the message stream is analyzed dynamically to determine the number of extensions each message can send and then the maximum number of messages is sent to the packing logic block. This reduces the number of unused slots in network flits, resulting in improved bandwidth and link utilization compared to passing a fixed number of messages to the packing logic block.

The message analyzer may be implemented in hardware. Messages for multiple message streams can be efficiently packed in an SMP or C2C network flit instead of fixing the number of messages that can be sent to the packing logic block.

TABLE 3 summarizes the packing efficiency that is achieved when the number of messages sent to the packing logic is fixed at four.

TABLE 3

|  | Number of messages picked from FIFO | Number of messages sent to packing logic block | Number of messages in network flits | Packing Efficiency | Comments |
| --- | --- | --- | --- | --- | --- |
| 1. | 4 | 4 | 4 in cycle 1 | 100% | No extensions in any of the 4 messages sent to packing logic block |
| 2. | 4 | 4 | 3 in cycle 1<br>1 in cycle 2 | 50% | One extension in at least one of the 4 messages sent to packing logic block |

TABLE 4 summarizes the packing efficiency that is achieved when the number of messages sent to the packing logic block is fixed at three.

TABLE 4

| | Number of messages picked from FIFO | Number of messages sent to packing logic block | Number of messages in network flits | Packing Efficiency | Comments |
|---|---|---|---|---|---|
| 1. | 4 | 3 | 3 | 75% | No extensions in any of the 4 messages sent to packing logic block. However, all four messages could have been packed in single flit. |
| 2. | 4 | 3 | 3 | 100% | There is one extension in at least one of the four requests send to packing logic block and therefore maximum of 3 can be packed. |

TABLE 5 summarizes the packing efficiency that is achieved when the number of messages sent to the packing logic block is dynamically selected by a message analyzer, in accordance with embodiments of the disclosure.

TABLE 5

| | Number of messages picked from FIFO | Number of messages sent to packing logic block | Number of messages in network flits | Packing Efficiency | Comments |
|---|---|---|---|---|---|
| 1. | 4 | 4 | 4 | 100% | No extensions in any of the 4 messages sent to packing logic block. All four can be packed into 1 flit. |
| 2. | 4 | 3 | 3 | 100% | One extension in at least one of the 4 messages sent to packing logic block. Maximum of 3 can be packed. |

TABLE 5 demonstrates that, in all the cases, an increased packing efficiency is achieved by use of a message analyzer to dynamically control the number of messages sent to the packing logic block. Indeed, the maximum packing efficiency can be achieved for a mix of incoming traffic streams.

Thus, the mechanism of the present disclosure enables the number of messages sent to the packing logic block to be determined dynamically by analyzing the incoming traffic stream, rather than fixing the number. As a result, the complexity of the packing logic block can be reduced, leading to a decrease in the amount of combinational logic needed. This, in turn, leads to savings in both power consumption and chip area.

In accordance with various embodiments of the disclosure, a computer-implemented method is provided for packing transaction messages into one or more flow control units (flit) for transmission in a data processing network. Transaction messages are received by a gateway block of the data processing network. The transaction messages may be of the same size or have various sizes. Based, at least in part, on the sizes of pending transaction messages and a size of a flow control unit (flit) of the data processing network, a maximum number of transaction messages that can be packed into a flit is determined. The maximum number of transaction messages is signaled to the packing logic block of the data processing network and the maximum number of pending transaction messages are sent to the packing logic block. In turn, the packing logic block packs the pending transaction messages into a flit and the flit is transmitted across a communication link.

In one embodiment, a transaction message includes a fixed size portion and zero or more extension portions. In this case the maximum number of transaction messages that can be packed into a flit is determined based, at least in part, on the number of extensions in the pending transaction messages. A network flit includes a multiple of fixed size slots, where a slot can contain a transaction message with no extension portions or a transaction message with one extension portion. For example, a transaction message may include a 12-byte fixed portion and zero or more 4-byte extension portions, and a network flit may include two 12-byte slots and two 16-byte slots. The flit may be transmitted across a communication link from a first integrated circuit chip to a second integrated circuit chip, for example.

The embodiments above have been described with reference to messages having a 12-Byte fixed portion and zero or more 4-Byte extensions, and for a network flit having two 12-Byte slots and two 16-Byte slots. However, it will be apparent to those of ordinary skill in the art that a message analyzer may be used for other size messages and for network flits having a different number of slots or different sized slots.

Figure 13:
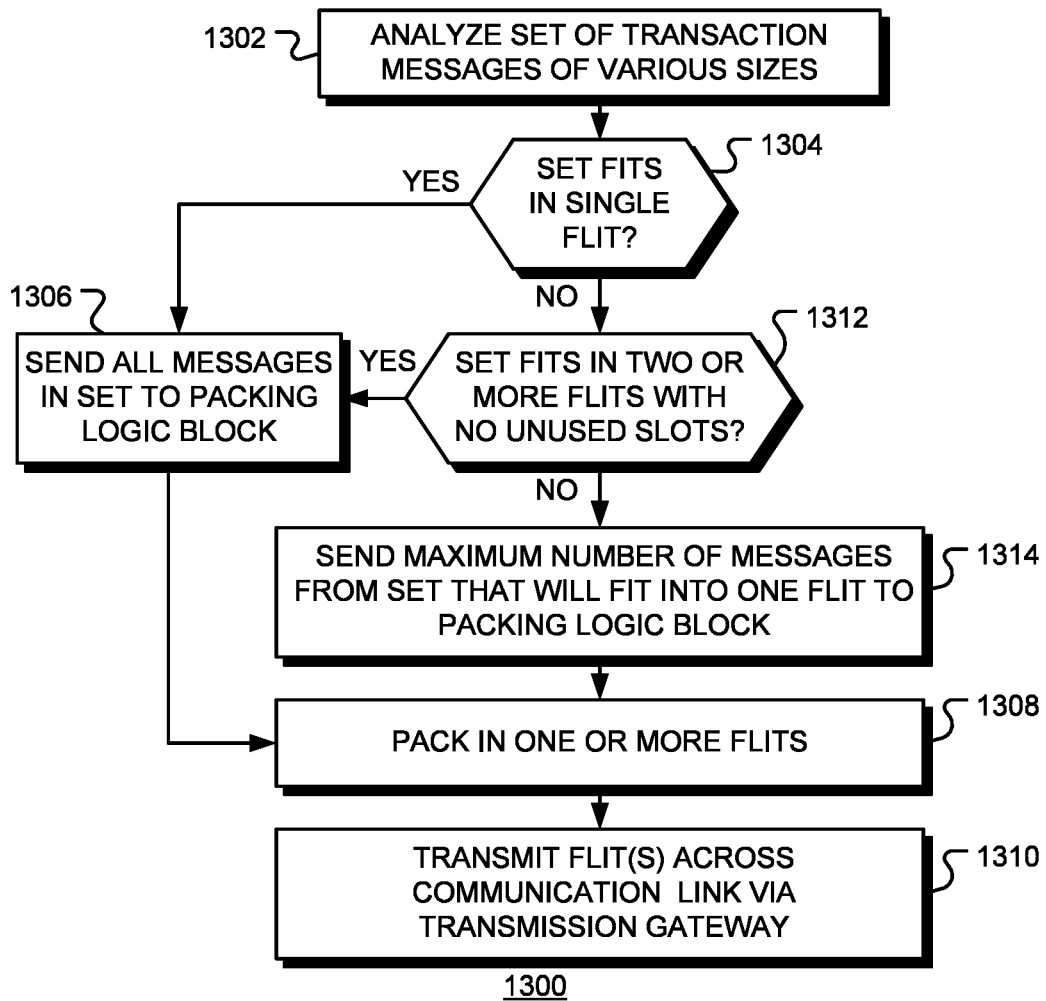
FIG. 13 is a flow chart of a method of efficient transaction message packing, in accordance with various representative embodiments.

FIG. 13 is a flow chart of a method of efficient transaction message packing, in accordance with various representative embodiments. At block 1302, a set of pending transaction messages in a data processing network are received and analyzed to determine how many to send to a packing logic block of the data processing network. The transaction messages have various sizes and are to be transmitted across a communication link of the data processing network in one or more network flits. Each network flit has one or more slots. Depending on the size of message, it may occupy a single slot or may overflow into one or more additional slots. At block 1304, it is determined if the set of transaction messages will fit into a single network flit. If so, as depicted by the positive branch from decision block 1304, all of the messages are sent to the packing logic block at block 1306. At block 1308, the messages are packed into a single flit and transmitted across a communication link via a transmission gateway at block 1310. If the set of transaction messages will not fit into a single network flit at block 1304, flow continues to decision block 1312. At decision block 1312, it is determined if the set of transaction messages can be efficiently packed into two or more flits, without leaving unnecessary unused slots. If the set of transaction messages can be efficiently packed, as depicted by the positive branch from decision block 1312, all of the messages are sent to the packing logic block at block 1306 and flow continues to block 1308. Otherwise, at block 1314, the maximum number of messages that will fit into a single network flit are sent to the message packing circuitry. At block 1308, the messages are packed into a single network flit and transmitted across a communication link at block 1310.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The embodiments described herein are combinable.

In one embodiment, a computer-implemented method comprising: receiving transaction messages for transmission in one or more network flow control units (flits) across a communication link of a data processing network, determining, based, at least in part, on sizes of the received transaction messages and a size of a network flit of the one or more network flits, a group of transaction messages having a maximum number of transaction messages that can be packed into the network flit; packing the group of transaction messages into the network flit; and transmitting the network flit across a communication link of the data processing network.

In another embodiment, the computer-implemented method, where a network flit of the one or more network flits has a plurality of slots and where determining the group of transaction messages includes determining how many of the received transaction messages can be packed into the network flit without leaving unused slots large enough to store a received message.

In another embodiment, the computer-implemented method, where determining the group of transaction messages includes determining how many of the received transaction messages can be packed into a single network flit of the one or more network flits.

In another embodiment, the computer-implemented method, further comprising sending the group of transaction messages to a packing logic block of the data processing network for packing into the network flit; and signaling to the packing logic block the number of transaction messages in the group of transaction messages.

In another embodiment, the computer-implemented method, where a transaction message includes a fixed size portion and zero or more extension portions, and determining the group of transaction messages that can be packed into one or more network flits is based, at least in part, on a number of extension portions in the received transaction messages.

In another embodiment, the computer-implemented method, where a transaction message includes a fixed size portion and zero or more extension portions, and where the network flit of the one or more network flits has a plurality of slots and a slot of the plurality of slots can contain a transaction message with no extension portions or a transaction message with one extension portion.

In another embodiment, the computer-implemented method, where a transaction message includes a 12-byte fixed portion and zero or more 4-byte extension portions, and the network flit of the one or more network flits includes one or more 12-byte slots and one or more 16-byte slots.

In another embodiment, the computer-implemented method, where the network flit of the one or more network flits includes four slots, and where the group of transaction messages consists of three transaction messages when the three transaction messages fit in a single network flit of the one or more network flits, and four transaction messages otherwise.

In another embodiment, the computer-implemented method, where transmitting the network flit across the communication link includes sending the network flit via a chip-to-chip gateway from a first integrated circuit chip to a second integrated circuit chip.

In another embodiment, a data processing network comprising a message analyzer configured to receive transaction messages in the data processing apparatus, and determine, based, at least in part, on sizes of the transaction messages and a size of a network flow control unit (flit), a group of transaction messages having a maximum number of the received transaction messages to pack into one or more network flow flits for transmission over a communication link, a packing logic block configured to pack the group of transaction messages into one or more network flits; and a transmission gateway configured to receive the one or more network flits from the packing logic block and transmit them across the communication link.

In another embodiment, the data processing network, where the transmission gateway uses a chip-to-chip gateway between a first chip, containing the message analyzer and the packing logic block, and a second chip.

In another embodiment, the data processing network, where the message analyzer is configured to determine the group of transaction messages to pack as a group of received transaction messages that can be packed into the one or more network flits without leaving unused slots large enough to store a received message.

In another embodiment, the data processing network, where the message analyzer is configured to determine the group of received transaction messages to pack as the largest group of transaction messages that can be packed into a network flit of the one or more network flits.

In another embodiment, the data processing network, where the message analyzer is further configured to signal to the packing logic block the number of transaction messages in the group of transaction messages.

In another embodiment, the data processing network, further comprising a local request tracker for storing transaction messages, a dispatch pipeline including a transaction picker configured to select transaction messages from the local request tracker that are ready for execution and send them through the dispatch pipeline, and one or more dispatch first-in-first-out (FIFO) buffers for transaction messages, where the received transaction messages are selected from the one or more FIFO buffers.

In another embodiment, the data processing network, where the transmission gateway includes a chip-to-chip gateway from a first integrated circuit chip to a second integrated circuit chip.

In another embodiment, the data processing network, where the transmission gateway is configured to transmit the one or more network flits over a symmetric multi-processor (SMP) or chip-to-chip (C2C) link.

In another embodiment, the data processing network, where the packing logic block is configured to pack transaction messages into the network flit having a plurality of slots.

In another embodiment, the data processing network, where a transaction message uses a fixed length portion and a variable number of extension portions, where a first slot of the network flit is sized to contain a transaction message having no extension portion and a second slot of the network flit is sized to contain a transaction message having one extension portion.

In another embodiment, the data processing network, where the message analyzer is configured to determine the group of transaction messages to send to the packing logic block based, at least in part, on the number of extension portions of the transaction messages and sizes of the slots.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A computer-implemented method comprising:
receiving transaction messages of various sizes for transmission in one or more network flow control units (flits) across a communication link of a data processing network, where the one or more network flits have a size specified by a protocol of the communication link;
analyzing the received transaction messages to determine the various sizes of the received transaction messages;
determining, based, at least in part, on the various sizes of the received transaction messages and the size of a network flit of the one or more network flits, a group of transaction messages having a maximum number of transaction messages that can be packed into the one or more network flits;
sending the group of transaction messages to a packing logic block of the data processing network for packing into the one or more network flits;

signaling to the packing logic block a number of transaction messages in the group of transaction messages;

packing, by the packing logic block, the group of transaction messages into the one or more network flits; and transmitting the one or more network flits across a communication link of the data processing network.

2. The computer-implemented method of claim 1, where a network flit of the one or more network flits has a plurality of slots and where determining the group of transaction messages includes:

determining how many of the received transaction messages can be packed into the one or more network flits without leaving unused slots large enough to store a received message.

3. The computer-implemented method of claim 1, where determining the group of transaction messages includes:

determining how many of the received transaction messages can be packed into a single network flit of the one or more network flits.

4. The computer-implemented method of claim 1, where the transaction messages are transaction request messages.

5. The computer-implemented method of claim 1, further comprising:

receiving data associated with the transaction messages; and packing, by the packing logic block, the data into one or more network flits for transmission across the communication link.

6. The computer-implemented method of claim 5, where the transaction messages are transaction response messages.

7. A computer-implemented method comprising:

receiving transaction messages for transmission in one or more network flow control units (flits) across a communication link of a data processing network;

determining, based, at least in part, on sizes of the received transaction messages and a size of a network flit of the one or more network flits, a group of transaction messages having a maximum number of transaction messages that can be packed into the one or more network flits;

packing the group of transaction messages into the one or more network flits; and transmitting the one or more network flits across a communication link of the data processing network, where:

a transaction message includes a fixed size portion and zero or more extension portions, and determining the group of transaction messages that can be packed into the one or more network flits is based, at least in part, on a number of extension portions in the received transaction messages.

8. The computer-implemented method of claim 7, where a network flit of the one or more network flits has a plurality of slots and a slot of the plurality of slots can contain a transaction message with no extension portions or a transaction message with one extension portion.

9. The computer-implemented method of claim 7, where:

the fixed size portion of the transaction message is a 12-byte fixed portion and an extension portion of the zero or more extension portions of the transaction message is a 4-byte extension portion, and a network flit of the one or more network flits includes one or more 12-byte slots and one or more 16-byte slots.

10. The computer-implemented method of claim 7, where a network flit of the one or more network flits includes four slots, and where the group of transaction messages consists of:

three transaction messages when the three transaction messages are the maximum number of transaction messages that can fit in a single network flit of the one or more network flits, and four transaction messages otherwise.

11. The computer-implemented method of claim 7, where transmitting the one or more network flits across the communication link includes sending the one or more network flits via a chip-to-chip gateway from a first integrated circuit chip to a second integrated circuit chip.

12. A data processing network comprising:

a message analyzer configured to:

receive transaction messages in the data processing network, a transaction message having a number of extension portions;

determine a group of transaction messages having a maximum number of the received transaction messages to pack into one or more network flow control units (flits) for transmission over a communication link, a network flit having a plurality of slots;

a packing logic block configured to pack the group of transaction messages into the one or more network flits; and a transmission gateway configured to receive the one or more network flits from the packing logic block and transmit them across the communication link, where the message analyzer is configured to determine the group of transaction messages to send to the packing logic block based, at least in part, on:

sizes of the received transaction messages;

the number of extension portions of the received transaction messages, a size of a network flit, and sizes of the slots in a network flit.

13. The data processing network of claim 12, where the transmission gateway comprises a chip-to-chip gateway between a first chip, containing the message analyzer and the packing logic block, and a second chip.

14. The data processing network of claim 12, where the message analyzer is configured to determine the group of transaction messages to pack as a group of received transaction messages that can be packed into the one or more network flits without leaving unused slots large enough to store a received message.

15. The data processing network of claim 12, where the one or more network flits are a plurality of network flits.

16. The data processing network of claim 12, where the message analyzer is further configured to signal to the packing logic block the number of transaction messages in the group of transaction messages.

17. The data processing network of claim 12, further comprising:

a local request tracker for storing transaction messages;

a dispatch pipeline including:

a transaction picker configured to select transaction messages from the local request tracker that are ready for execution and send them through the dispatch pipeline; and one or more dispatch first-in-first-out (FIFO) buffers for transaction messages, where the received transaction messages are selected from the one or more FIFO buffers.

18. The data processing network of claim 12, where the transmission gateway includes a chip-to-chip gateway from a first integrated circuit chip to a second integrated circuit chip.

19. The data processing network of claim 12, where the transmission gateway is configured to transmit the one or more network flits over a symmetric multi-processor (SMP) or chip-to-chip (C2C) link.

20. The data processing network of claim 12, where a transaction message comprises a fixed length portion and a variable number of extension portions, where a first slot of the network flit is sized to contain a transaction message having no extension portion and a second slot of the network flit is sized to contain a transaction message having one extension portion.

* * * * *